ized at a fundamental acoustic frequency; and the modulated
United States Patent Kruezer

[15] 3,700,890

[45] Oct. 24, 1972

[54] MEASUREMENT OF GAS IMPURITY CONCENTRATION BY INFRARED ABSORPTION SPECTROSCOPY

[72] Inventor: Lloyd Barton Kruezer, Bernardsville, N.J.

[73] Assignee: Bell Telephone Laboratories, Incorporated, Murray Hill, Berkeley Heights, N.J.

[22] Filed: Nov. 2, 1970

[21] Appl. No.: 85,884

[52] U.S. Cl. .................................................250/43.5 R
[51] Int. Cl. .................................................G01n 21/26
[58] Field of Search .....................250/43.5 R; 356/89

[56] References Cited

UNITED STATES PATENTS

| | | |
|---|---|---|
| 3,039,353 | 6/1962 | Coates et al. ..................356/89 |
| 3,287,556 | 11/1966 | Good ......................250/43.5 R |
| 3,171,027 | 2/1965 | Wallack ...................250/43.5 R |
| 2,938,118 | 5/1960 | Martin ....................250/43.5 R |
| 3,215,832 | 11/1965 | Madsen et al. .........250/43.5 R |
| 3,447,876 | 6/1969 | Barringer ................250/43.5 R |
| 3,162,761 | 12/1964 | Luft ........................250/43.5 R |

Primary Examiner—James W. Lawrence
Assistant Examiner—Davis L. Willis
Attorney—R. J. Guenther and Arthur J. Torsiglieri

[57] ABSTRACT

An impurity in a gas medium is detected and its concentration measured by an infrared absorption spectroscopy technique. An infrared laser beam, whose wavelength is at or near an absorption line of the suspected impurity, is amplitude modulated at a fundamental acoustic frequency; and the modulated beam is incident upon the gas medium. The amplitude of the second harmonic acoustic frequency component of the resulting induced pressure (or temperature) variation of the gas medium is indicative, with great sensitivity, of the presence and concentration of the impurity.

9 Claims, 1 Drawing Figure

PATENTED OCT 24 1972
3,700,890
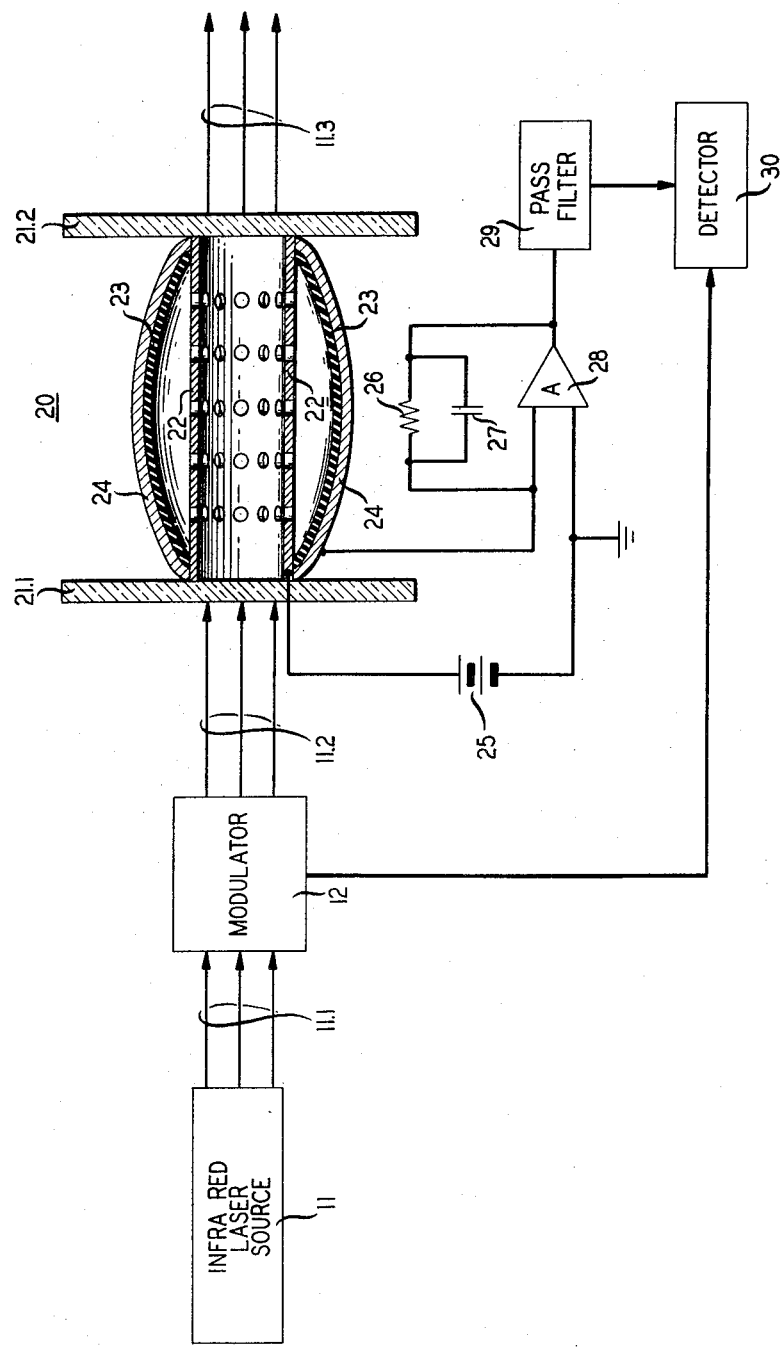
INVENTOR
L. B. KREUZER
BY D. Caplan
ATTORNEY

MEASUREMENT OF GAS IMPURITY CONCENTRATION BY INFRARED ABSORPTION SPECTROSCOPY

FIELD OF THE INVENTION

This invention relates to the field of optical absorption spectroscopy, and more particular to infrared absorption systems for detecting impurities in a gaseous medium.

BACKGROUND OF THE INVENTION

Many years ago, A. G. Bell, *Proc. Am. Assoc. Adv. Science*, Vol. 29, page 115 (1880), *Phil Mag.* Vol 11, page 510 (1881); J. Tyndall, *Proc. Roy. Soc.* Vol. 31, page 307 (1881); and W. C. Röntgen, *Phil. Mag.* Vol. 11, page 308 (1881) discovered the opto-acoustic effect and its use in the "spectrophone." Briefly, input optical radiation, periodically interrupted at a frequency in the audible range, was directed upon a gas medium in a glass container; and the periodic pressure fluctuations resulting from the absorption of radiation by the gas was detected by ear through a listening tube connected to the container. This effect is ordinarily most pronounced when a substantial portion of the input radiation is in the infrared portion of the electromagnetic spectrum, where the radiative lifetime of the gas molecules is larger than the relaxation time for the energy of excited molecules to be converted into heat, so that a substantial portion of the (periodic) input radiation is converted into (periodically) heating the gas. Since the infrared absorption spectra of different molecules in a gas depend upon the nature of the vibration and rotation states of the various molecules, the magnitude of the acousto-optical effect is a function of the input infrared wavelength as well as the composition of the gas and can be used to analyze this composition.

Using thermal sources of infrared radiation in combination with wavelength selective filters and mechanical choppers, the opto-acoustic effect is presently used in commercial systems for the purpose of analyzing for impurities in gases, such as the presence of carbon dioxide in air. In such systems, for example, in infrared beam is provided having infrared wavelength components equal to the wavelengths of infrared absorptions of the impurity (carbon dioxide). The amplitude of the beam is modulated at an acoustic frequency to form a modulated input infrared beam. This input beam is incident upon the sample of air to be tested for the presence of the impurity. An output acoustic frequency, equal to the modulating frequency, is detected with a difference microphone. This microphone is responsive to the difference in pressure between the test sample of gas and a pure sample of gas upon which the input beam is also incident. The sensitivity of such techniques in such systems is limited by the fact that the signal to noise ratio in the acoustic output at the modulating frequency of the infrared beam (that is, for example the ratio of the absorption by the carbon dioxide relative to the air) is limited by the contribution to the absorption process (and hence, to the acoustic output) by the major constituents in the gas, even if the wavelength of the input infrared beam is monochromatically centered at an absorption line of the impurity to be detected. With the increasing need and importance of detecting microscopic traces of impurities in the air, for monitoring and controlling the pollution of our environment, it is desirable to have a more sensitive system for detecting impurities in gases.

Accordingly, it is an object of this invention to provide apparatus for detecting gaseous impurities, with greater sensitivity than in the prior art.

SUMMARY OF THE INVENTION

This invention is based upon the realization and utilization of a phenomenon associated with the acoustic output arising from modulation of an infrared beam. In particular, if the input infrared beam has an intensity sufficiently strong to cause nonlinearity (preferably quadratic) in the absorption process in the impurity, the acoustic output signal from the impurity at a harmonic frequency (preferably the second) of the modulation frequency increases nonlinearly (preferably quadratic), whereas the acoustic background due to the other constituents increases only linearly with the intensity of the input infrared beam. To this end, the invention involves use of an input infrared source of sufficient intensity to cause such nonlinearity in the absorption process, together with detection of the acoustic output of a harmonic (preferably the second) of the modulation frequency.

In a specific embodiment of this invention, an intense infrared beam ($\lambda = 3.39$ micron) is chopped at a fundamental frequency of the order of 100 Hz. This chopped beam is incident upon an absorption cell filled with a sample of air to be tested for methane. The cell is in the shape of a cylinder whose walls are made of an apertured layer of structural metal. This layer of metal is surrounded by a dielectric layer of teflon, upon which is an evaporated layer of aluminum. Fluctuations in the pressure of the air at the second harmonic of the fundamental are produced in proportion to the amount of methane in the gas. These fluctuations in turn modulate the electrical capacitance of the capacitor formed by the structural metal dielectric, and aluminum layer. An electrical amplifier and electrical detector of signals at the second harmonic respond to these changes in capacitance and thereby reveal the presence and amount of methane in the air.

BRIEF DESCRIPTION OF DRAWING

This invention can be better understood from the following detailed description when read in conjunction with the drawing in which the FIGURE shows, partly in cross section, a system for detecting impurities in a gas, in accordance with a specific embodiment of the invention. For the sake of clarity only, the FIGURE is not to scale.

DETAILED DESCRIPTION

As shown in the FIGURE, an absorption cell 20 is filled with air or other gas, typically at a pressure of about 100 mm Hg or more, containing methane as an impurity to be detected. An intense infrared helium-neon laser source 11 provides a beam 11.1 having a wavelength of 3.39 micron which is an absorption infrared line of methane. A modulator 12, typically a Pockel cell or acousto-optic device, modulates the intensity of the beam 11.1 at a fundamental acoustic frequency $f_1$, preferably in the range of about 20 Hz to 500 Hz, for example, 100 Hz. The modulation is preferably sinusoidal, and in all events it is important that substantially no second harmonic frequency $f_2$ ($=2 f_1$) of the fundamental be present in the Fourier components of the modulation. An amplitude modulated infrared beam 11.2 exits from the chopper 12 and traverses the absorption cell 20, exiting therefrom as beam 11.3 as indicated in the FIGURE.

The absorption cell 20 includes a cylindrically shaped metal tube 22 containing the gas to be tested. The tube 22 is provided with a plurality of apertures for communication of the gas with a cylindrically shaped dielectric insulator layer 23 surrounding the metal tube 22. Typically, the insulator layer 23 is essentially teflon, but electret materials can be used to support even higher voltage biases for greater sensitivity of microphone detection. A cylindrically shaped metal layer 24, typically evaporated aluminum, surrounds the insulator layer 23. The microscopic distance between the layers 23 and 24 from the walls of the tube 22 is exaggerated in the FIGURE, for purposes of showing that some of the gas within the tube 22 can leak out into the microscopically small space therebetween, in response to pressure variations in this gas, thereby forming a variable capacitance microphone. The tube 22 is sealed at both ends by glass windows 21.1 and 21.2, which are transparent to the infrared beam 11.2. A battery 25 supplies a voltage bias to the tube 22 and the metal layer 24. Electrical signals are produced by the microphone caused by varying capacitance of the capacitor which is formed by the walls of the cell 22, the dielectric layer 23 together with the variable amount and pressure of the gas in the space therebetween, and the metal layer 24. These electrical signals in turn are excited by the pressure variation in the gas in response to the modulated laser beam 11.2. Amplification of these electrical signals is provided by an amplifier 28, advantageously including a feedback capacitor 27 of capacitance $C_f$ and a feedback resistor 26 of resistance $R_f$. After amplification, these electrical signals are subjected to an electrical filter 29 which is of the bandpass type preferably centered at the second harmonic of (i.e., twice) the fundamental frequency produced in the laser beam 11.2 by the modulator 12. The output of the filter 29 is fed to an A.C. detector 30 of the electrical output of the filter 29 (centered at the passband frequency). Typically, the detector 30 is a synchronous detector.

Optimization of the output acoustic second harmonic is obtained when the intensity of the infrared beam is approximately equal to one-half the beam intensity which would maximize the output acoustic fundamental frequency.

When the modulation of the infrared input beam is sinusoidal, the intensity I satisfies:

$$I = I_o (1 + A \sin 2\pi f_1 t) \quad (1)$$

where $A$ is a constant modulation depth and $f_1$ is the fundamental chopping frequency.

In order to express the optimum beam intensity, the following parameters are defined: S is the absorption line strength of the impurity, defined by $2\pi S = \int \sigma(\omega) d\omega$; $\sigma(\omega)$ the absorption cross section for an impurity molecule in the ground state of the transition at circular frequency $\omega$, $b$ is the probability than an impurity molecule is either in the upper or lower state of the transition. Then, the optimum $I_o$ in photons per unit area satisfies:

$$I_o = \left(\frac{1}{T_c} + \frac{1}{T_R}\right) / 2bS; \quad (2)$$

where $T_c$ is collision induced relaxation time of upper vibrational state of the relevant transition, and $T_R$ is the relaxation time due to spontaneous emission from the upper to the lower state (all rotational states assumed to be in thermal equilibrium in order to define these quantities).

The preferred design parameters for the tube 22 can be derived from consideration of signals and noise. The diameter of the cylinder of the tube 22 preferably approximates the diameter of the laser beam 11.2 propagating therethrough, so that the beam and the tube are in registry. In this way, the signal from the variable capacitance microphone is optimized. Typically, the diameter D of the tube 22 is of the order of 1 mm, which is a convenient size for the cross section of the laser beam 11.2. Since the microphone signal to noise ratio improves as $(LD)^{1/2}$, where L is the length of the tube 22, L is preferably as large as possible, consistent with mechanical and optical alignment. Typically, therefore, L is of the order of 1 to 5 cm.

Turning to the advantageous values of $R_f$ and $C_f$ in the amplifier 28, the voltage gain is proportional to $C_m/C_f$ where $C_m$ is the capacitance of the microphone, typically of the order of 200 p.f. Thus, $C_f$ should be smaller than $C_m$. On the other hand, $R_f$ should be small enough to prevent static charge accumulation from saturating the amplifier 28. Taking all these factors into consideration, with an acoustic fundamental frequency $f_1 = 400$ Hz, typically of the capacitance of $C_f$ is selected to be of the order of 1 to 10 p.f. while the resistance of $R_f$ is selected to be of the order of $10^{10}$ ohms.

Although this invention has been described in detail in terms of a particular embodiment, various modifications can be made by the worker of ordinary skill in the art without departing from the scope of the invention. For example, any sufficiently intense source of optical radiation can be used instead of the laser 11, such as tunable optical parametric devices. Likewise, other gaseous impurities, such as CO, $CO_2$, $N_2O$, in air, can be detected in the cell 20 using optical sources 11 containing wavelength(s) corresponding to the infrared absorption line(s) of these impurities.

What is claimed is:

1. In combination:
   a. an absorption cell containing a gas medium to be analyzed for a gaseous impurity;
   b. means forming a beam of electromagnetic radiation containing a wavelength corresponding to an absorption line of the impurity, the intensity of said beam being modulated at a fundamental frequency whereby the beam induces a time varying pressure response in the medium, said pressure response containing at least one harmonic component of a frequency which is a harmonic relative to the frequency of the fundamental frequency at which the beam is being modulated; and
   c. means for detecting the said harmonic component response of the medium to the beam.

2. The combination recited in claim 1 in which the beam of electromagnetic radiation is characterized by a maximum of intensity at an infrared frequency component.

3. The combination recited in claim 1 in which the harmonic frequency is equal to twice the fundamental frequency.

4. The combination recited in claim 3 in which the infrared frequency component is supplied by an optical parametric device.

5. The combination recited in claim 3 in which the fundamental frequency is in the acoustic range.

6. The combination recited in claim 5 in which the means for detecting includes a microphone.

7. The combination recited in claim 3 in which the infrared frequency is at least approximately equal to the frequency of an absorption line of the gaseous impurity.

8. A method for detecting an impurity in a medium which comprises the steps of:

a. directing upon the medium a beam of electromagnetic radiation which includes a wavelength corresponding to an absorption line of the impurity and which is modulated in intensity at a fundamental frequency whereby the beam induces a time varying pressure response in the medium, said pressure response containing at least one harmonic component relative to the frequency of the fundamental frequency at which the beam is being modulated; and b. monitoring the said harmonic component response of the medium.

9. The method recited in claim 8 in which the beam comprises an infrared beam having a maximum of intensity at a frequency at least approximately equal to the frequency of an absorption line of the impurity, and the harmonic is equal to twice the fundamental frequency.

* * * * *